US012529745B2

(12) United States Patent
Staeb et al.

(10) Patent No.: US 12,529,745 B2
(45) Date of Patent: Jan. 20, 2026

(54) METHOD AND SYSTEM FOR MAGNETIC RESONANCE IMAGING

(71) Applicant: Siemens Healthineers AG, Forchheim (DE)

(72) Inventors: Daniel Staeb, Port Melbourne (AU); Karl-Philipp Kunze, London (GB); Peter Speier, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 75 days.

(21) Appl. No.: 18/521,097

(22) Filed: Nov. 28, 2023

(65) Prior Publication Data

US 2024/0219498 A1   Jul. 4, 2024

(30) Foreign Application Priority Data

Dec. 30, 2022  (EP) ..................................... 22217276

(51) Int. Cl.
*G01R 33/56*  (2006.01)
*G01R 33/48*  (2006.01)
*G01R 33/565*  (2006.01)

(52) U.S. Cl.
CPC ..... *G01R 33/5608* (2013.01); *G01R 33/4818* (2013.01); *G01R 33/56509* (2013.01)

(58) Field of Classification Search
None
See application file for complete search history.

(56) References Cited

U.S. PATENT DOCUMENTS

| | | | |
|---|---|---|---|
| 9,778,336 B2* | 10/2017 | Polimeni | G01R 33/4835 |
| 10,436,866 B2 | 10/2019 | Bilgic et al. | |
| 2018/0306880 A1* | 10/2018 | Salerno | A61B 5/055 |
| 2019/0113587 A1* | 4/2019 | Paulson | G01R 33/4808 |
| 2020/0292648 A1* | 9/2020 | Speier | G01R 33/4835 |

(Continued)

FOREIGN PATENT DOCUMENTS

EP        3709043 A1     9/2020

OTHER PUBLICATIONS

Breuer, Felix A. et al. "Controlled Aliasing in Parallel Imaging Results in Higher Acceleration (CAIPIRINHA) for Multi-Slice Imaging" Magnetic Resonance in Medicine, vol. 53, No. 3, pp. 684-691, 2005 // DOI: 10.1002/mrm.20401.

(Continued)

*Primary Examiner* — Rodney E Fuller
(74) *Attorney, Agent, or Firm* — Banner & Witcoff, Ltd.

(57) ABSTRACT

Techniques for performing magnetic resonance imaging are provided, which include applying at least two different pulse sequences designed for simultaneous excitation of at least two slices, and measuring k-space lines of the slices with a Parallel Imaging Results in Higher Acceleration (CAIPIRINHA) sampling scheme. Each pulse sequence comprises multiple different phase patterns, each phase pattern is used for exciting one of the slices, and the phase patterns of different pulse sequences are arranged relative to each other according to a Hadamard encoding. Images are reconstructed from the measured k-space lines by forming image slices based on different linear combinations of corresponding slices acquired with different pulse sequences.

20 Claims, 5 Drawing Sheets

(56) References Cited

U.S. PATENT DOCUMENTS

2021/0052186 A1* 2/2021 Mickevicius .......... A61B 5/055
2022/0130080 A1* 4/2022 Zeller ....................... G06T 5/50

OTHER PUBLICATIONS

Mueller, S.: "Simultaneous Multislice Imaging (SIMUSIM) for Improved Cardiac Imaging"; in: Magnetic Resonance in Medicine; vol. 10; pp. 145-155; 1989; ISSN 0740-3194/89.

Stäb, Daniel, et al. "High Resolution Myocardial First?Pass Perfusion Imaging With Extended Anatomic Coverage." Journal of Magnetic Resonance Imaging 39.6 (2014): 1575-1587. (abstract only); 2014.

Staeb, Daniel et al. "CAIPIRINHA Accelerated SSFP Imaging" Magnetic Resonance in Medicine, vol. 65, pp. 157-164, 2011 // DOI:10.1002/mrm.22600.

Hoberg J.R. et al.: "Hadamard Encoded Time-Dependent Phase Constraint Parallel Image Reconstruction", Proceedings of The International Society For Magnetic Resonance In Medicine, 19th Annual Meeting & Exhibition, May 7, 2011 (May 7, 2011), XP040621331, Canada.

Setsompop, Kawin et al. "Blipped-Controlled Aliasing in Parallel Imaging for Simultaneous Multislice Echo Planar Imaging with Reduced g-Factor Penalty" Magnetic Resonance in Medicine, vol. 67, pp. 1210-1224, 2012 (first published online 2011) // DOI 10.1002/mrm.23097.

Ferrazzi, G. et al.:"Autocalibrated Multiband CAIPIRINHA With Through?Time Encoding: Proof of principle and application to cardiac tissue phase mapping", in: Magn Reson Med. 2018; 1-15. (https:// doi.org/10.1002/mrm.27460).

Barth, Markus et al., "Simultaneous Multislice (SMS) Imaging Techniques: SMS Imaging"; Magnetic Resonance in Medicine., Bd. 75, Nr. 1, Aug. 26, 2015 (Aug. 26, 2015), pp. 63-81, XP055408927, US ISSN: 0740-31; 2015.

Rapacchi S. et al.: "Simultaneous Multi-Slice (SMS) Cardiac CINE Using Embedded Hadamard-Encoded Reference Data At 7 Tesla", Proceeding of The International Society For Magnetic Resonance In Medicine, Joint Annual Meeting ISMRM-ESMRMB 2018, No. 1056, Jun. 1, 2018 (Jun. 1, 2018), XP040700264.

* cited by examiner

METHOD AND SYSTEM FOR MAGNETIC RESONANCE IMAGING

CROSS-REFERENCE TO RELATED APPLICATIONS

The present application claims priority to and the benefit of European patent application no. EP 22217276.9, filed on Dec. 30, 2022, the contents of which are incorporated herein by reference in their entirety.

TECHNICAL FIELD

The disclosure pertains to a method and a system for magnetic resonance imaging, respectively, for controlling a magnetic resonance imaging (MRI) system, a control unit for an MRI system, as well as a respective MRI system.

BACKGROUND

MRI typically requires a choice between resolution/anatomic coverage, signal to noise ratio (SNR), and scan time. Averaging may be required to achieve sufficient SNR. Acceleration methods, e.g. parallel imaging (pMRI), are employed to shorten scan time or improve spatial resolution.

In pMRI, images are reconstructed from data sampled below the Nyquist limit using information collected with multiple receive coils. The achievable acceleration is limited by the amount of independent information (variation in coil sensitivities) that can be obtained with those coils. Depending on slice positioning and subject anatomy, the collection of independent information may be limited, in turn limiting the maximum acceleration factors.

Different acceleration methods, e.g. Compressed Sensing, use prior knowledge (e.g. signal sparsity in a well-known transform domain), to remove undersampling artifacts and reconstruct images from undersampled data. Such methods are typically compatible with pMRI, and joint reconstructions can be performed.

Simultaneous Multislice Imaging (SMS) is an older magnetic resonance imaging technique dating back to the 1980s. This method comprises the acquisition of multiple, parallel 2D slices at the same time by exciting those slices simultaneously. SMS is not an acceleration method per se, but rather a method to gain signal-to-noise ratio (SNR) for a constant scan time or to invest SNR to increase the number of slices measured in a given time (see e.g. Barth M. et al. "Simultaneous multislice (SMS) imaging techniques"; Magn Reson Med. 2016 January; 75(1):63-81).

Different encoding schemes can be used for SMS. In the "POMP" (Phase-Offset Multi Planar) encoding scheme, for example, the relative signal phase between the slices is toggled between 0° and 180° from one phase encoding step to the next. The result is that the signal content of one slice shifted by FOV/2 (half the field of view). POMP data is fully sampled if the field of view ("FOV") is extended in the direction of the phase encoding ("PE") to accommodate both slices.

Since 2D multislice imaging affords a relatively long measuring time, an acceleration of the measurement is advantageous. SMS is an effective method for accelerating 2D multislice measurements or extending anatomic coverage. To that end, pMRI and SMS can be employed together. While conventional pMRI relies on sensitivity variations along the phase encoding direction, pMRI-accelerated SMS makes use of coil sensitivity variations along the slice and phase encoding direction, and the total acceleration factor that can be achieved is typically higher than with conventional pMRI alone. However, in presence of limited coil sensitivity variations, the maximum acceleration factor remains limited.

The only viable parallel imaging acceleration method for SMS in use today, referred to as "CAIPIRINHA" (Controlled Aliasing in Parallel Imaging Results in Higher Acceleration), is applying the POMP encoding scheme to an undersampled k-space to shift undersampled images of the two slices against each other and to reduce pixel aliasing and overlap. The simultaneously acquired and encoded slices are separated in the image reconstruction process. Typically, parallel imaging reconstruction methods such as GeneRalized Autocalibrating Partially Parallel Acquisitions (GRAPPA) or sensitivity encoding (SENSE) are employed. The relative shift of the slices in the FOV drastically reduces the "g-factor" noise amplification, and hence the SNR penalty for the parallel imaging reconstruction (see. e.g. Breuer et al. "Controlled aliasing in parallel imaging results in higher acceleration (CAIPIRINHA) for multi-slice imaging"; Magn Reson Med 2005; 53:684-691).

The phase modulation of k-space that is required to shift the different slices with respect to each other can be introduced by modulating the RF phase (Magn Reson Med 2005; 53:684-691, Magn Reson Med 2011 January; 65(1):157-64) for each slice individually or by switching additional gradients along the slice encoding axis during the course of the data acquisition (blipped CAIPIRINHA encoding, Setsompop et al.).

Compared to a sequential and conventional in-plane parallel imaging accelerated measurement of N slices, a CAIPIRINHA measurement of the same slices provides an SNR advantage. In an ideal case, where no g-factor noise amplification is introduced during the reconstruction, the SNR advantage is equal to the square root of N.

However, every known acceleration method has limits and drawbacks. For instance, pMRI typically suffers from residual artifacts, while Compressed Sensing typically requires random/incoherent sampling.

SUMMARY

It is the object of the present disclosure to improve the known devices and methods to facilitate an improvement in Simultaneous Multislice Imaging. This object is achieved by the embodiments as further described herein, including the claims.

A method according to the disclosure for magnetic resonance imaging, i.e. for controlling a magnetic resonance imaging system to acquire image data, comprises the following steps:

applying at least two different pulse sequences, each pulse sequence being designed for simultaneous excitation of at least two slices and measuring k-space lines of the slices with a CAIPIRINHA sampling scheme, a) wherein each pulse sequence comprises multiple different, e.g. periodic, phase patterns, each phase pattern used for exciting one of the slices, and b) wherein the phase patterns of different pulse sequences are arranged relative to each other according to a Hadamard encoding, reconstructing images from the measured k-space lines by forming image slices based on different linear combinations of corresponding slices acquired with different pulse sequences.

According to the method, CAIPIRINHA encoding, e.g. temporal parallel acquisition technique (TPAT) or a randomized sampling scheme, is used within measurements to differentiate slices, and Hadamard encoding is used across measurements to cancel individual slice signals in combinations of individual measurements. The difference with respect to existing methods is the use of a combination of CAIPIRINHA and Hadamard encoding, as well as the use of additional motion correction, signal modelling, and/or similar operations that facilitate a successful (Hadamard) linear combination, for acquiring datasets that are combined with different linear combinations during the reconstruction process. The measurement of k-space lines of the slices results in datasets that are used for reconstruction. The concept especially facilitates higher acceleration factors by cancelling static signals before coil array based unaliasing operations and using Hadamard encoding as a "sparsity promoting" or "prior knowledge creating" feature in a motion correction based (e.g. iterative) reconstruction setting.

In the course of the method, a plurality of datasets is acquired by measuring the k-space lines of the slices with a CAIPIRINHA sampling scheme. This is a known technique and part of the daily practice in MRI. Acquired points in k-space are shifted from one another by applying additional offsets to the phase-encoding gradient tables.

CAIPIRINHA typically uses undersampling. The principle of undersampling is also known in the technical field of magnetic resonance tomography. When undersampling, there is measured a number of k-space lines that is significantly lower than the number of lines that has to be measured to achieve a given image resolution and cover a field of view (FoV) without aliasing after a normal reconstruction. To obtain images with a suitable resolution and a given FoV with an undersampled dataset, there are known suitable reconstruction methods.

Each acquired dataset ideally comprises the same slices and (ideally also) the same k-space lines. Some acquisitions, e.g. with TPAT or randomized sampling could deviate from that, but for every k-space line variation there is inevitably a matching Hadamard-variation (i.e. the same k-space lines acquired with different phase patterns). However, the datasets differ, since the k-space lines are measured with different pulse sequences (due to different phase patterns). For the simultaneous excitation of N slices, it is thus preferred to apply at least N different, Hadamard encoded pulse sequences.

The difference between these pulse sequences is not arbitrary. According to the disclosure, each pulse sequence comprises multiple different (e.g. periodic) phase patterns, which describe the encoding of the relative phases of a k-space line (e.g. a phase encoding (PE) line) of different slices and could be achieved by gradients and/or with RF phase variations. In an embodiment, there is one individual phase pattern for each recorded slice in one pulse sequence, since each phase pattern is used for exciting one of the slices. For example, a first phase pattern for exciting a first slice could be 0°, 0°, 0°, . . . and for a second phase pattern for exciting a second slice, the relative signal phase could be toggled between 0° and 180°. Other patterns are also possible, e.g. toggling between 45° and −45° in a first phase pattern and between −45° and 45° in a second phase pattern, or for more slices patterns rotating through 0°, 90°, 180° and 270° (in this order or another order).

The patterns may be e.g. based on a temporal parallel Acquisition technique (TPAT), e.g. the first sequence comprising a first TPAT pattern, the second sequence comprising the first TPAT pattern shifted with Hadamard, the third sequence comprising a second TPAT pattern (e.g. with a line shift), the fourth sequence comprising the second TPAT pattern shifted with Hadamard, and so on. Randomized patterns are also possible, i.e. where the Hadamard encoding is applied to randomized patterns.

If the patterns of a first pulse sequence are chosen, the patterns of the other pulse sequences do not differ in an arbitrary way. The disclosure provides that the phase patterns of different pulse sequences may be arranged relative to each other according to a Hadamard encoding.

A Hadamard encoding is achieved by varying the relative phases of the signal contributions from the different slices. The Hadamard encoding adds special information to the measured data that is needed to separate the contributions from the simultaneously acquired slices while reconstructing images from the thus recorded data. Concerning the term "Hadamard encoding", there are two example schemes that may be implemented. The first example Hadamard encoding is a "binary" Hadamard encoding, where the phase of a k-space line is toggled between the two values 0° and 180°. Another example Hadamard encoding is an "extended" Hadamard encoding, where the phase of a k-space line is shifted in more than two steps, e.g. between the discrete values 0°, 90°, 180°, 270° (four slices), however, other values and other numbers of slices could also be chosen. The values for the phase-shift may be chosen such that phase-induced values are annihilated (i.e. canceled) by adding or subtracting the recorded data.

If, in a first pulse sequence, a phase pattern toggled between two phase angles A and B, an example Hadamard encoding would be inverting this toggling or shifting this toggling by 180° (toggling between −A and −B or between A+180° and B+180°). A result would be, for example, a toggling between B and A in a second pulse sequence (A=−B or B=A+180°). Thus for a phase pattern 0°, 180°, 0°, . . . in the first pulse sequence, 180°, 0°, 180°, . . . would be a preferred different phase pattern in the second pulse sequence.

If, in a first pulse sequence, a phase pattern is rotated through a pattern of the phase angles A, B, C, D, an example Hadamard encoding would be rotating the angles of this phase pattern to the right or left or adding 90° to the phase angles. An example result would be a rotating shift for the pattern, e.g. B, C, D, A or D, A, B, C in the second pulse sequence and, in further pulse sequences, C, D, A, B or C, D, A, B and D, A, B, C or B, C, D, A. Thus for a phase pattern 0°, 90°, 180°, 270°, . . . in the first pulse sequence, 90°, 180°, 270°, 0°, . . . , 180°, 270°, 0°, 90°, . . . and 270°, 0°, 90°, 180°, . . . would be an example different phase pattern for pulse patterns of other pulse sequences.

Thus, in each pulse sequence, different phase patterns may be used for exciting different slices and, looking at the excitation of one single slice with different pulse sequences, there are always used the "same" phase angles in this phase pattern with the phase angles of this phase pattern altered according to Hadamard encoding. It should be noted that it is possible that a number of slices (e.g. one slice only) could have a phase pattern with only one phase angle (e.g. 0°). This pattern for exciting this number of slices will stay the same throughout the pulse sequences. However, the other phase patterns may differ from each other.

For the reconstruction of images, several methods are known. Typically, image slices are reconstructed from the datasets, wherein the image slices correspond to slices in the object that have been excited during data acquisition. These image slices can then be combined to form a 3D image. Since the slices are recorded several times (with the different pulse sequences), there will be several raw image slices of the same slice of the object.

According to the disclosure, the (final) image slices are formed based on (multiple) different linear combinations of corresponding slices acquired with different pulse sequences. This means that slices (e.g. in k-space or already reconstructed raw image slices) are combined by a linear combination to form image slices. It should be noted that only slices are combined that correspond with each other, i.e. that are at the same position in the recorded object or, respectively, show the same region of the object.

It is important that not only one single linear combination is applied or a number of same linear combinations, but multiple different linear combinations. For example, for N slices that have been excited simultaneously, N different linear combination schemes may be used. For example, for two slices, there may be used an addition of the slices as a first linear combination and a subtraction of the slices as a second linear combination. For more slices, linear combinations using $e^{i\pi}$ or sine/cosine functions in combination with the phase angles may be advantageous. For example, an averaging with a normalizing linear combination may be performed.

Due to the Hadamard encoding of the phase patterns, the image slices may be separated or unaliased easily. Even when pre-reconstructing image slices with known methods, a further linear combination of the already reconstructed image slices may be advantageous.

The linear combinations may be selected such that slice annihilation of the image slices occurs (e.g. an addition or subtraction when using a toggled phase pattern such as 0°, 180°, 0°, 180°, . . . ). Such annihilation may be used as constraint or prior to the reconstruction itself. Additionally, the Hadamard based slice annihilation across time frames (i.e. slices of different datasets) may be used as a measure for sparsification across time frames.

For example, in a case where two slices have been excited simultaneously with a constant 0°-pattern (first slice) and a toggled 180°-0°-pattern (second slice), wherein the toggling of the 180°-0°-pattern is inverted in the course of the Hadamard encoding and reconstructed with an addition or subtraction as linear combination, the annihilation is a direct result of the Hadamard encoding, since in every dataset the signals of the encoded slices are superposed. After the addition, a different slice is annihilated as it is after the subtraction. Thus, a separation of the slices is possible. If there was movement between the acquisition of the datasets, the annihilation may be imperfect and a separation of the slices may be defective. A motion correction is thus very advantageous. Thus, using suitable linear combinations on the datasets, one of two superposed slices vanishes due to the Hadamard encoding. Using N suitable linear combinations for N superposed slices, every linear combination will lead to a single reconstructed image layer (image slice).

In an embodiment, an averaging step may be applied in the course of the reconstruction process.

The reconstruction may also be an iterative reconstruction, e.g. jointly solving motion-correction (MoCo), slice separation and anti-aliasing. Especially, a reconstruction of time frames using such iterative reconstruction could be used together with slice-annihilation (apart from through-time contrast changes) as prior to the MoCo.

In a practical application, the different simultaneously excited slices (different time frames) can be provided with individual phase cycles in e.g. two ways: a) a gradient (blipped) CAIPIRINHA encoding using additional gradient blips along the slice direction, or b) RF-phase based CAIPIRINHA encoding using varying RF phases to create the required CAIPIRINHA phase modulation in k-space.

For the repetitive measurements of the slices, Hadamard encoding provides an additional option to render the simultaneously excited slices differentiable (since the pulse sequences are different). The phase modulation during the acquisition of each individual slice should be selected such that linear combinations (e.g. adding and/or subtracting) of different measurements results in the positive superposition of one of the slices while the signal of the other slices is cancelled.

It should be noted that here, where Hadamard encoding is used together with CAIPIRINHA encoding for quasi-repetitive measurements, motion and contrast changes could result in residual signals from one slice being present in the reconstructed image of another slice, which results in residual artefacts, hampering a simple use of this approach in clinical practice. The correction of motion is an embodiment of the disclosure and will be described more accurately below. Contrast changes may be corrected using known coil array encoding capabilities.

A slice separation of superimposed slices may be achieved based on the Hadamard encoding due to a suitable selection of the linear combinations. However, the basic method is particularly advantageous for non-moving objects. If the object moves (e.g. the heart), then a motion correction should be applied.

By way of the special combination of CAIPIRINHA encoding and Hadamard encoding, additional information is created that can advantageously be used for reconstruction (e.g. in-plane unaliasing or separation of slices). It should be noted that due to the linear combination of the data, the Hadamard encoding is not used for generating a calibration-dataset, but directly for the reconstruction process.

A system according to the disclosure for magnetic resonance imaging comprises:
  a sequence unit designed for creating at least two different pulse sequences, each pulse sequence being designed for simultaneous excitation of at least two slices and measuring k-space lines of the slices with a CAIPIRINHA sampling scheme,
  a) wherein each pulse sequence comprises multiple different, e.g. periodic, phase patterns, each phase pattern used for exciting one of the slices, and
  b) wherein the phase patterns of different pulse sequences are arranged relative to each other according to a Hadamard encoding,
  a reconstruction unit designed for reconstructing images from the measured k-space lines by forming image slices based on different linear combinations of corresponding slices acquired with different pulse sequences.

The functions of these units has been described above.

A control unit for controlling a magnetic resonance imaging system according to the disclosure comprises a system according to the disclosure.

A magnetic resonance imaging system according to the disclosure comprises a control unit according to the disclosure.

Some units or modules of the system mentioned herein may be completely or partially realized as software modules running on and/or executed by a processor of a respective computing system, e.g. of a control device of a magnetic resonance imaging system. A realization largely in the form of software modules may have the advantage that applications already installed on an existing computing system can be updated with relatively little effort to install and run these units of the present application. The object of the disclosure is also achieved by a computer program product with a computer program that is directly loadable into the memory of a computing system, and which comprises program units (e.g. one or more processors, processing circuitry, etc.) to perform the steps of the method, at least those steps that could be executed by a computer when the program is executed by the computing system. It should be noted that an application of a pulse sequence here may comprise, for instance, "sending control commands to control an MRI scanner to apply the pulse sequence". In addition to the computer program, such a computer program product may also comprise further parts such as documentation and/or additional components, hardware components such as a hardware key (a dongle, etc.) to facilitate access to the software, etc.

A computer readable medium such as a memory stick, a hard-disk or other transportable or permanently-installed carrier may serve to transport and/or to store the executable parts of the computer program product so that these can be read from a processor unit (e.g. one or more processors, processing circuitry, etc.) of a computing system. A processor unit may for instance comprise one or more microprocessors or their equivalents.

Example embodiments and features of the disclosure are given by the dependent claims, as revealed in the following description. Features of different claim categories may be combined as appropriate to give further embodiments not described herein.

According to a method, a phase pattern is applied that is designed to use an integer number N of different phases, wherein the single phases in the used set of phases are 360°/N spaced apart in phase space. For example, the integer number N may be a divisor of 360°. As another example, for the excitation of M slices, (integer number) N may be a divisor of M or M is a divisor of N. For example, when exciting two slices, the phase angles may be 0°, 0°, 0°, . . . (spaced apart 0°=360°/1) and 0°, 180°, 0°, 180°, . . . (spaced apart 180°=360°/2). When exciting four slices, the phase angles may be 0°, 90°, 180° and 270° (spaced apart 90°=360°/4) or 0°, 180° (see above) or simply 0° (see above).

In an embodiment, the phase patterns with the different angles $A_N$ are selected from among the patterns:

$A_1, A_1, A_1, \ldots$
$A_1, A_2, A_1, A_2, \ldots$, preferably wherein $A_2 = 360° - A_1$
$A_1, A_2, A_3, A_1, A_2, \ldots$
$A_1, A_2, A_3, A_4, A_1, A_2,$ and so on.

The pattern $A_1, A_2, A_1, A_2, \ldots$ may e.g. be used for the excitation of two slices with 45°, −45°, 45°, −45° . . . and −45°, 45°, −45°, 45° . . . , e.g. with a blipped CAIPIRINHA acquisition.

In an embodiment, the Hadamard encoding shifts the phase angles of at least one of the phase patterns of a pulse sequence such that patterns of phase angles applied at one point in time stay the same, but are at different temporal positions in each pulse sequence. This means that groups of signals applied at the same time in a pulse sequence stay the same in (e.g. all) other pulse sequences, but are applied at different points of time within the pulse sequences.

According to an embodiment, a gradient CAIPIRINHA encoding is applied in the pulse sequences, e.g. using additional gradient blips along the slice direction. Alternatively, an RF-phase based CAIPIRINHA encoding may be applied in the pulse sequences, e.g. using varying RF phases to create the required CAIPIRINHA phase modulation in k-space. These schemes result in advantageous datasets.

According to an embodiment, in the course of the reconstruction, groups of slices acquired with the same pulse sequence are reconstructed, each group being based on a different pulse sequence. Often, slices of these groups are superposed. The slices of each group may be unaliased or separated by linear combinations of different groups such that reconstructed slices of one group and respective reconstructed slices of another group are added to each other, resulting in a first image-slice, and subtracted from each other, resulting in a second image-slice.

In an embodiment, where each reconstructed group comprises superimposed slices that comprise information of two or more slices of the group, the linear combinations may be used for unaliasing the superimposed slices to form individual image-slices.

In an embodiment, where each reconstructed group comprises separated slices, e.g. based on a GRAPPA reconstruction and a joint slice and in-plane unaliasing, linear combinations may be used for forming individual image-slices.

As said above, in addition to the method according to the disclosure, motion correction of datasets acquired with different pulse sequences may be advantageous. The motion correction may be applied prior to and/or during reconstruction. Using CAIPIRINHA encoding and Hadamard encoding together with a dedicated reconstruction that corrects for motion may improve the outcome of CAIPIRINHA encoded image reconstructions, which ultimately facilitates higher acceleration factors. The motion correction compensates a movement between two different CAIPIRINHA encoded acquisitions of k-space lines.

Thus, according to an embodiment, a motion correction for the slices is executed, e.g. relative to one selected reference group of slices. In this selected reference group of slices, all slices have been acquired with the same pulse sequence. Several methods for motion correction are known in the art and can be applied here.

For example, there may be made a full slice-by-slice reconstruction of image slices. Then, a slice-by-slice motion estimate may be made, and the reconstructed image slices may be motion-corrected based on this motion estimate. This motion estimate may e.g. be a motion field estimation, since the motion of different slices may be different.

According to an embodiment, a 2D or 3D motion field is generated that describes the motion between the same slices acquired with different pulse sequences. The motion correction is then executed based on the generated motion field, and the original slices (or optionally also the already reconstructed slices). The motion field may be determined based on reconstructions of the slices performed individually for each pulse sequence acquisition. Here, it should be noted that movements of two slices are superposed in one data acquisition since both slices are excited simultaneously, and the movements of these slices are often not identical. The motion field should be generated such that the motion of both slices is estimated individually and then used for motion correction of the superposed state. Since there are several datasets of several acquisitions, there are several superposed states of the same slices. If the motion field is chosen correctly, all superposed states should accord to each other and may be separated by the linear combination.

In various embodiments, the motion correction may be rigid or non-rigid. In an embodiment, non-rigid motion correction results in 2D or 3D motion fields (2D: 4 fields: (x direction+y-direction)×(forward+backward), 3D: 6 fields). These fields may then be considered by the respective reconstruction method. Motion correction may also be based on trained machine learning models estimating motions of an object in the slices.

According to an embodiment, the motion correction is executed for reconstructed (image) slices, e.g. for unaliased slices, relative to one selected reference group of slices, wherein all of these slices have been acquired with the same pulse sequence.

According to an embodiment, the reconstruction process is based on an iterative approach, wherein slice separation, unaliasing, and motion correction is executed in an iterative manner. Prior knowledge and/or sparsity transforms may be used additionally. In an embodiment, sparsity of images is a measure for the quality of motion correction. Alternatively or additionally, conventional reconstructions of the slices performed individually for each pulse sequence acquisition may serve as a first estimate. The reconstruction may e.g. make use of the signal cancellation in certain combinations of measurements after motion is corrected as a pre-processing step for a conventional parallel imaging reconstruction and/or as additional prior knowledge in iterative reconstructions. Thus, for this iterative embodiment, the Hadamard encoding generates additional information that may be used for the reconstruction process, e.g. as prior knowledge.

Especially in such iterative process, but also in other reconstruction processes, reconstruction methods based on a signal model may be used. Such a signal model may be e.g. based on the assumption of a known and defined signal characteristic, e.g. exponential with $s=s_0.\exp(-t/T)$ in the space (x,y,slc,t) where slc is the known slice index. The measurement may be performed such that the single time frames differ in contrast with known signal variations, e.g. concerning a T1, T2 or T2* relaxation. During the reconstruction, parameters, such as so and T of the present example, are estimated voxel-for-voxel, and the signal model is integrated into the iterative reconstruction together with the linear combinations (according to the Hadamard encoding). In this case, the coefficients are determined correctly, and the linear combinations of the different Hadamard encoded datasets result in annihilations of slices similar to a good motion correction. This may be used as prior knowledge in the iterative reconstruction process. The function of the signal model is similar as the function of the motion field in motion correction. In an embodiment, motion correction and contrast correction may be combined.

Other embodiments include using this Hadamard-based prior knowledge. These embodiments do not have to be combined with a motion correction, but may additionally or alternatively implement a correction of contrast changes.

According to an embodiment, an undersampled set of in-plane encoding signals, e.g. in form of a set of phase encoding signals, is applied by leaving out complete pairs of k-space lines (especially phase encoding-line pairs), e.g. based on a regular grid or on an irregular pattern (e.g. for compressed sensing type recons). Irregular pattern means that the measured k-space lines are not equidistant.

According to an embodiment, the measurement is performed by receiving a measured signal with multiple coils that have parallel imaging encoding capability. Thus, the measurement is performed with the MRI signal detected with multiple receiver coils with individual coil sensitivities. It is not necessarily required that those sensitivities are different for the two slices (however, this would be advantageous). It is also not necessarily required that encoding capability is available for slice separation (however, this could additionally be applied).

The method according to the disclosure is especially advantageous for segmented acquisitions, undersampled acquisitions, and random undersampled acquisitions. Furthermore, not all slices may be excited in the same manner at every measurement, but that slice-excitation patterns may also be applied. An example pattern for three slices would be exciting S1 and S2 together, then exciting slices S1 and S3, and then slices S2 and S3. It is also possible to acquire only a part of the k-space lines at a first measurement and other k-space lines with further measurements.

For SMS accelerated averaged acquisitions, e.g. SMS, PSIR, MoCo, etc., the encoding capabilities of the coil array may be used for slice separation and in-plane unaliasing, limiting the total acceleration factor. A reconstruction making use of the Hadamard based prior knowledge may use the entire encoding capabilities of the coil array for in-plane unaliasing, while the slice separation is done intrinsically by motion corrected Hadamard encoding. This facilitates higher total acceleration factors or reduced artifact load at comparable acceleration factors.

BRIEF DESCRIPTION OF THE DRAWINGS

Other objects and features of the present disclosure will become apparent from the following detailed descriptions considered in conjunction with the accompanying drawings. It is to be understood, however, that the drawings are designed solely for the purposes of illustration and not as a definition of the limits of the disclosure.

In the diagrams, like numbers refer to like objects throughout. Objects in the diagrams are not necessarily drawn to scale.

DETAILED DESCRIPTION OF THE DISCLOSURE

Figure 1:
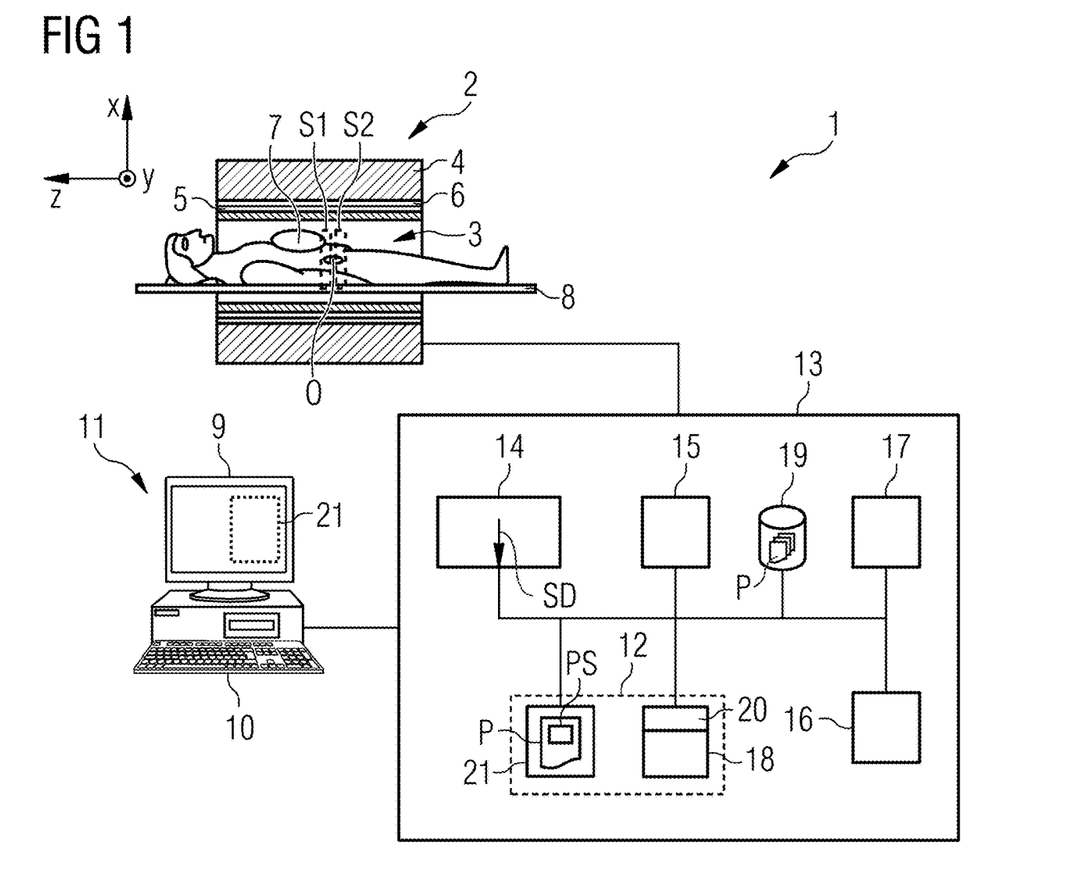
FIG. 1 illustrates an example MRI system according to an embodiment of the disclosure.

FIG. 1 illustrates an example MRI system according to an embodiment of the disclosure. The MRI system 1 includes the actual magnetic resonance scanner (data acquisition unit) 2 with an examination space 3 or patient tunnel in which a patient or test object is positioned on a driven bed 8, in whose body the actual examination object is located. The magnetic resonance scanner 2 is typically equipped with a basic field magnet system 4, a gradient system 6, as well as an RF transmission antenna system 5 and an RF reception antenna system 7. In the shown exemplary embodiment, the RF transmission antenna system 5 is a whole-body coil permanently installed in the magnetic resonance scanner 2, in contrast to which the RF reception antenna system 7 is formed as local coils (symbolized here by a single local coil)

to be arranged on the patient or test subject. In principle, however, the whole-body coil can also be used as an RF reception antenna system, and the local coils can respectively be switched into different operating modes.

The basic field magnet system 4 is designed such that at least two slices S1, S2 can be recorded. It here is designed in a typical manner so that it generates a basic magnetic field in the longitudinal direction of the patient, i.e. along the longitudinal axis of the magnetic resonance scanner 2, which proceeds in the z-direction. The gradient system 6 typically includes individually-controllable gradient coils to be able to switch (activate) gradients in the x-direction, y-direction, or z-direction independently of one another.

The MRI system 1 is a whole-body system with a patient tunnel into which a patient can be completely introduced. However, in principle the disclosure can also be used at other MRI systems, for example with a laterally open, C-shaped housing, as well as in smaller magnetic resonance scanners in which only one body part can be positioned.

Furthermore, the MRI system 1 has a central control device 13 that is used to control the MRI system 1. This central control device 13 (or "control unit" or "controller" 13) includes a sequence control unit (or "sequence controller") 14 for measurement sequence control. With this sequence control unit 14, the series of radio-frequency pulses (RF pulses) and gradient pulses can be controlled depending on a selected pulse sequence PS (see e.g. FIGS. 6 to 8) or, respectively, a series of multiple pulse sequence PS to acquire magnetic resonance images of the slices S1, S2 within a measurement session. For example, such a series of pulse sequence PS can be predetermined within a measurement or control protocol P. Different control protocols P for different measurements or measurement sessions are typically stored in a memory 19 and may be selected by an operator (and possibly modified as necessary), and then be used to implement the measurement.

To output the individual RF pulses of a pulse sequence PS, the central control device 13 has a radio-frequency (RF) transmission device 15 that generates and amplifies the RF pulses and feeds them into the RF transmission antenna system 5 via a suitable interface (not shown in detail). To control the gradient coils of the gradient system 6, the control device 13 has a gradient system interface 16. The sequence control unit 14 communicates in a suitable manner with the RF transmission device 15 and the gradient system interface 16 to emit the pulse sequence PS.

Moreover, the control device 13 has a RF reception device 17 (likewise communicating with the sequence control unit 14 in a suitable manner) to acquire magnetic resonance signals (i.e. raw data) for the individual measurements, which magnetic resonance signals are received in a coordinated manner from the RF reception antenna system 7 within the scope of the pulse sequence PS.

A reconstruction unit (or "image reconstructor") 18 receives the acquired raw data and reconstructs magnetic resonance image data therefrom for the measurements. This reconstruction is typically performed according to the present disclosure. The image data may then be outputted or stored in a memory 19.

Operation of the central control device 13 may take place via a terminal 10 with an input unit and a display unit 9, via which the entire MRI system 1 may thus also be operated by an operator. MR images may also be displayed at the display unit 9, and measurements may also be planned and started by means of the input unit (possibly in combination with the display unit 9), and e.g. suitable control protocols may be selected (and possibly modified) with suitable series of pulse sequence PS as explained above.

The control unit 13 comprises a system 12 configured to perform any of the methods according to the disclosure. This system 12 comprises the following components that may be implemented as software modules.

A sequence unit 21 (or a "sequencer") is configured to generate at least two different pulse sequences PS, each pulse sequence PS being configured to simultaneously excite at least two slices S1, S2 and measuring k-space lines of the slices S1, S2 with a CAIPIRINHA sampling scheme (see following figures).

The reconstruction unit 18 is further configured to reconstruct images from the measured k-space lines by forming image slices I1, I2 based on different linear combinations L of corresponding measurements M1, M2 (see following figures) acquired with different pulse sequences PS.

A correction unit 20 (or a "corrector" or "correction circuitry") is configured to execute a motion correction for the slices S1, S2, e.g. relative to one selected reference group of slices S1, S2. In this reference group, all slices S1, S2 are acquired with the same pulse sequence PS. The correction unit 20 may be configured to estimate a motion field F and to apply a motion correction based on this motion field F or for a motion correction between fully reconstructed shots or for an iterative motion correction (see also following figures).

It should be noted that the system 12 may also be configured by using the sequence control unit 14 that is modified by comprising the sequence unit 21. The sequence unit 21 may also be present in the terminal 10 as indicated by the dashed box.

The MRI system 1 according to the disclosure, and for instance the control device 13, may have a number of additional components that are not shown in detail but are typically present at such systems, for example a network interface, to connect the entire system with a network to facilitate the exchange of raw data and/or image data or, respectively, parameter maps, but also additional data (for example patient-relevant data or control protocols).

The manner by which suitable raw data are acquired by radiation of RF pulses and the generation of gradient fields, and MR images are reconstructed from the raw data, is known and thus need not be explained in detail herein.

Figure 2:
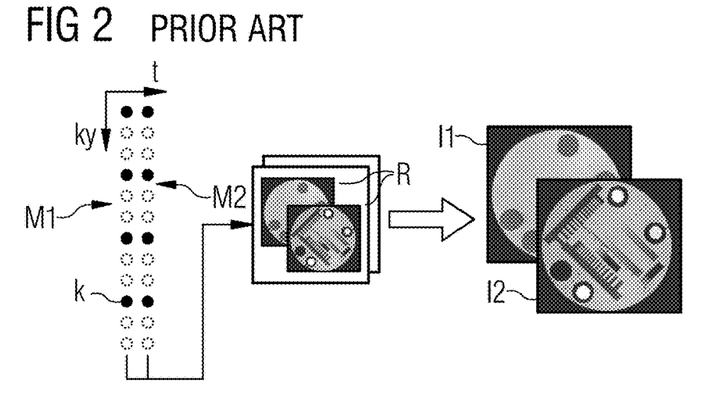
FIG. 2 illustrates a conventional reconstruction of image slices from SMS data.

FIG. 2 illustrates a conventional reconstruction of image slices from SMS data. Specifically, FIG. 2 shows the conventional reconstruction of image slices I1, I2 from SMS data. The measurements M1, M2 provide the acquired datasets of k-space lines k of any two slices S1, S2, and are symbolized at the left side. Shown from top to bottom are the k-space lines k of the phase encoding-axis ky recorded in the course of one acquisition. At different time points (see time axis t, running from left to right) the k-space lines k of the two slices S1, S2 are acquired in a first measurement M1 and in a second measurement M2. Dashed k-space lines k represent an undersampling so these k-space lines k have not been recorded.

From the acquired datasets, raw image slices R are reconstructed, e.g. with slice GRAPPA and in-plane GRAPPA using joint slice and in-plane unaliasing. By using averaging techniques, final image slices I1, I2 are reconstructed from the raw image slices R. This reconstruction of each individual shot, combined with averaging across reconstructed shots in final step, may also be called CAIPIRINHA reconstruction.

Figure 3:
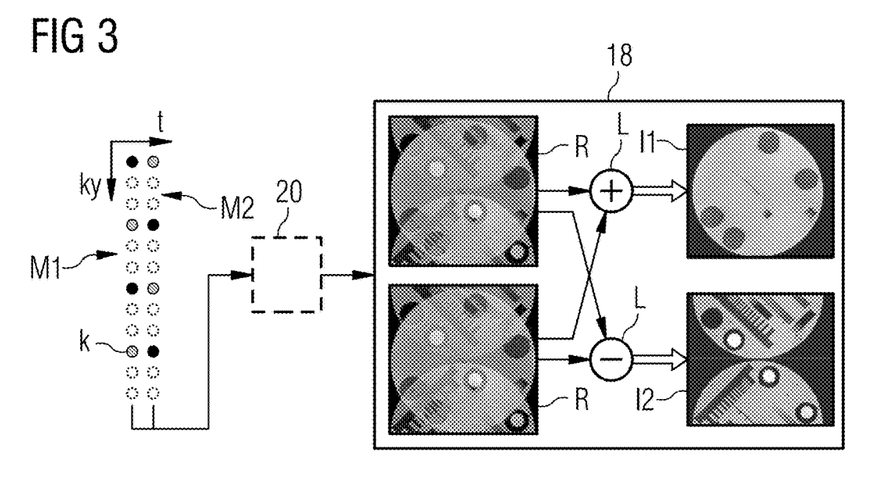
FIG. 3 illustrates an example reconstruction of image slices according to an embodiment of the disclosure.

FIG. 3 illustrates an example reconstruction of image slices according to an embodiment of the disclosure. In particular, FIG. 3 shows the reconstruction of image slices I1, I2. On the left, again two measurements M1, M2 providing two datasets are shown. In contrast to FIG. 2, the k-space lines k of each slice are acquired by using a CAIPIRINHA encoding (see changing fill of the dots from top to bottom, representing different phases) and additionally, the two measurements M1, M2 differ by a Hadamard encoding of the CAIPIRINHA encoding (see different patterns of the dots from left to right).

Before the reconstruction, there may be applied an optional motion correction symbolized by a dashed correction unit 20. In the reconstruction unit 18, there are first reconstructed raw image slices R that show the two recorded slices S1, S2 of the object O in a superimposed manner. By applying two different linear combinations L, the information is separated, and two individual image slices I1, I2 are formed. This separation is possible due to the Hadamard encoding, i.e. since different phases have been recorded, one of the slices S1, S2 of the two datasets interfere destructively at a certain linear combination L and annihilate each other. So, any of the linear combinations L annihilate a different slice S1, S2 resulting in a clear separation of image slices I1, I2.

Figure 4:
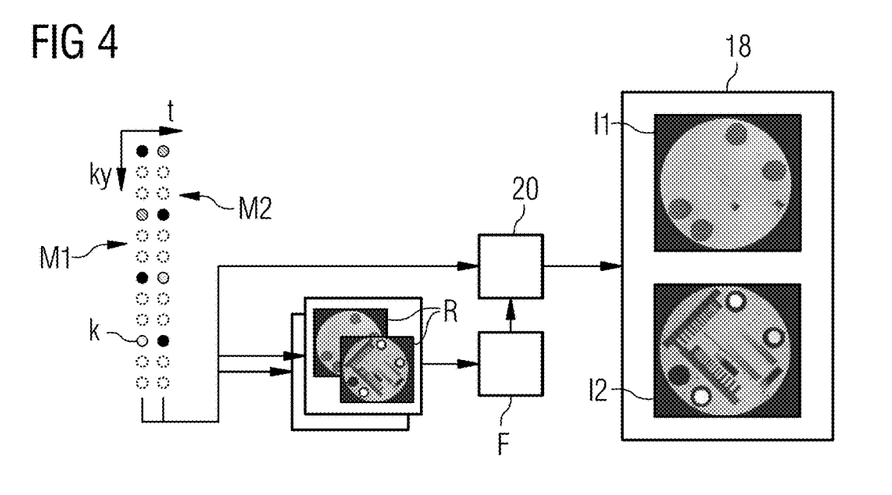
FIG. 4 illustrates an example reconstruction of image slices according to another embodiment of the disclosure.

FIG. 4 illustrates an example reconstruction of image slices according to another embodiment of the disclosure. Specifically, FIG. 4 shows the reconstruction of image slices I1, I2. The datasets are identical to FIG. 3, but the motion correction is different. At first, raw image slices R are reconstructed, e.g. as shown in FIG. 2. These raw image slices R are used to generate a motion field F, representing the motion of the object O in every slice, e.g. individually for any of the slices S1, S2. This motion field F is then used by the correction unit 20 to correct the motion of the original datasets, and image slices I1, I2 are reconstructed e.g. as shown in the reconstruction unit 18 of FIG. 3.

The (conventional) multi-shot reconstruction delivers fully reconstructed images. However, for high acceleration factors and limited coil array encoding capabilities, the image quality will be degraded. Nonetheless, motion fields F can still be estimated successfully. Once the motion fields F are estimated, they can be applied followed by further reconstruction steps. Since the coil array is not required for the slice separation, all encoding capability can be utilized for the in-plane unaliasing, resulting in improved image quality.

Figure 5:
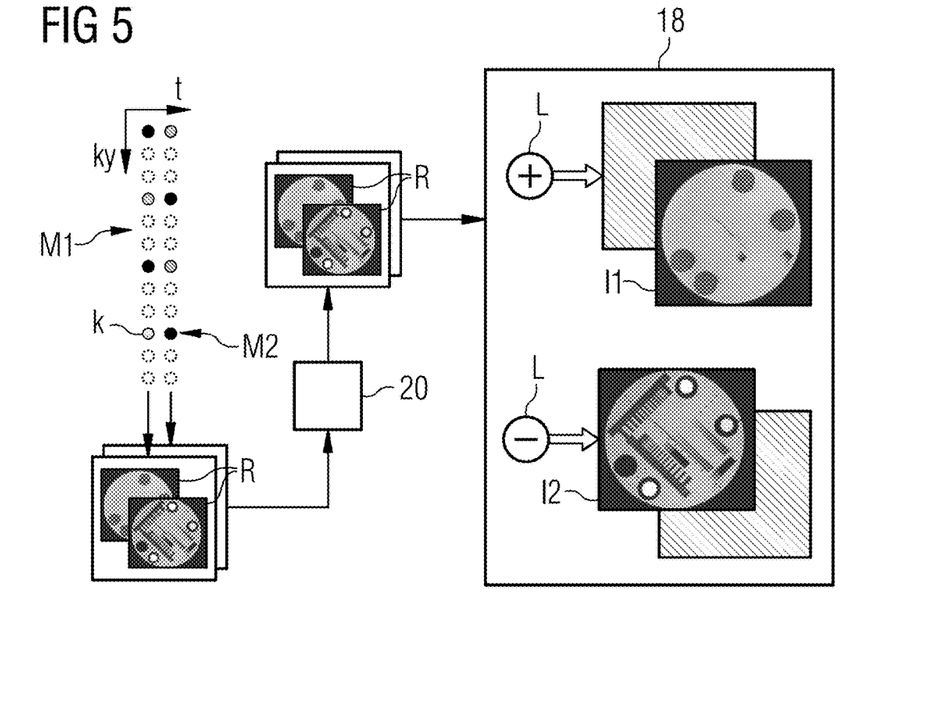
FIG. 5 illustrates an example reconstruction of image slices according to another embodiment of the disclosure.

FIG. 5 illustrates an example reconstruction of image slices according to another embodiment of the disclosure. Specifically, FIG. 5 shows the reconstruction of image slices I1, I2. As described above for FIG. 4, raw image slices R are reconstructed from the datasets. In this example, a motion field F is not generated, although it is also possible to use such motion field F here as well. In contrast to FIG. 4, the raw image slices R are used here for reconstruction instead of raw (k-space) data. It should be noted that the raw image slices R are already separated in this example, but the final image slices I1, I2 are reconstructed using different linear combinations L. Due to these linear combinations L, whole raw image slices R annihilate (as indicated by the hatched boxes symbolizing annihilated slices) such that the result is one single set of image slices I1, I2. Looking at the annihilated slices, it could be the case that there is no total annihilation in praxis. However, sparsity in well-defined areas of the "annihilated" slices then could become a measure of motion correction accuracy.

Figure 6:
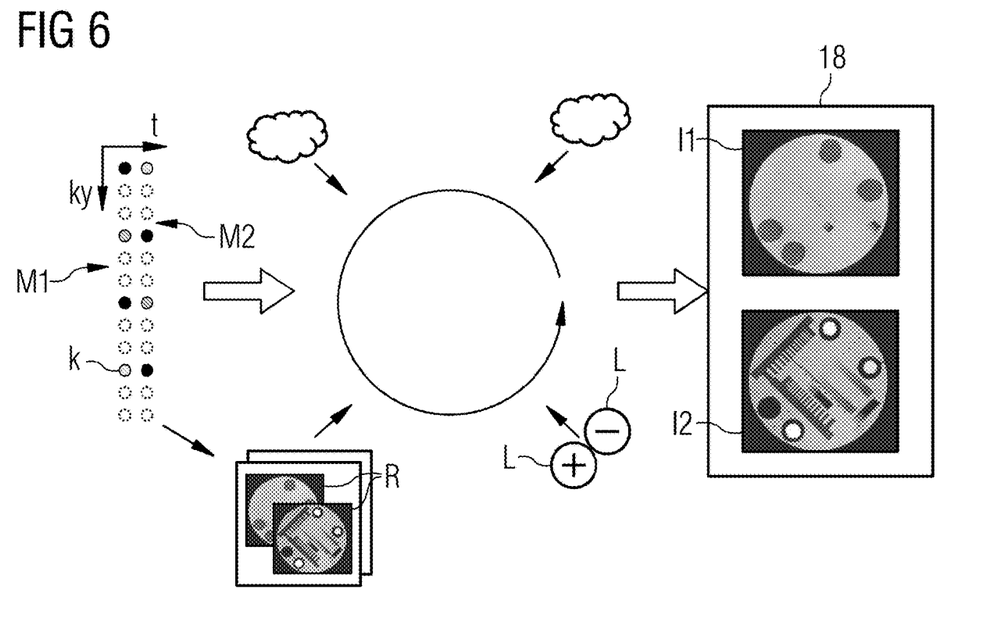
FIG. 6 illustrates an example iterative reconstruction of image slices according to an embodiment of the disclosure.

FIG. 6 illustrates an example iterative reconstruction of image slices according to an embodiment of the disclosure. Specifically, FIG. 6 shows an iterative reconstruction of image slices I1, I2. The datasets are the same as in FIGS. 3 to 5, but the reconstruction method is different. Pre-reconstructed raw image slices R, and information about linear combinations L, are inputted together with conventional prior knowledge and sparsity transforms (left cloud), and additional prior knowledge (right cloud) regarding when images of simultaneously excited slices (e.g. raw image slices R or further reconstructed slices) become heavily sparse or zero if motion correction is successful (the sparsity here becomes a measure of motion correction accuracy) into a simultaneous process dealing with iterative recon solving motion, slice separation, and undersampling. The output is an averaged and motion corrected reconstruction of individual image slices I1, I2.

Figure 7:
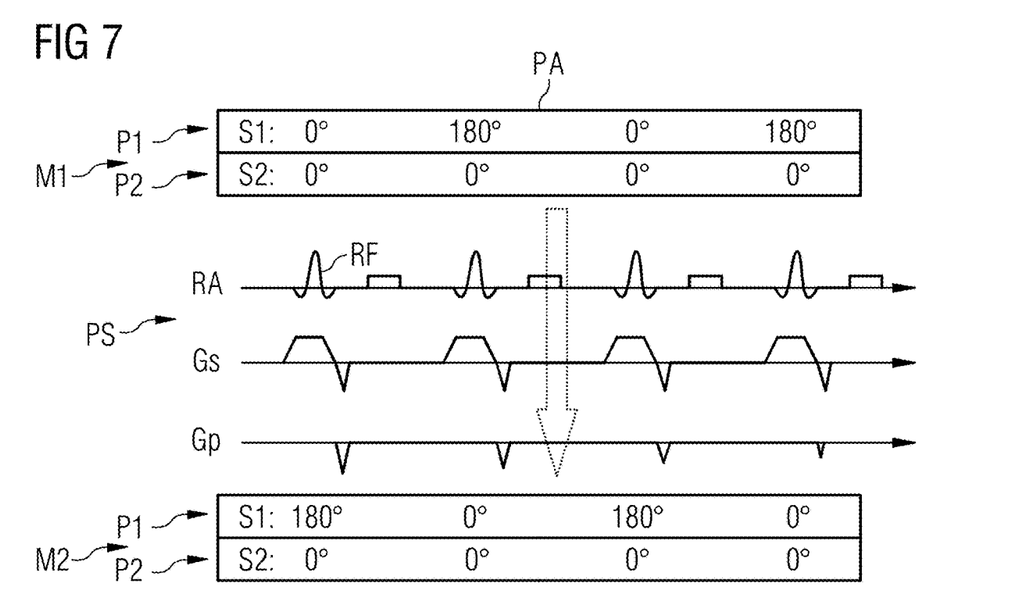
FIG. 7 illustrates an example of pulse sequences for exciting two slices according to an embodiment of the disclosure.

FIG. 7 illustrates an example of pulse sequences for exciting two slices according to an embodiment of the disclosure. Specifically, FIG. 7 shows an example of pulse sequences PS for exciting two slices S1, S2. A pulse sequence PS is outlined showing three axes. The upper axis is the RF axis RA, where four radio frequency signals RF are arranged. The second axis is a first gradient axis Gs, where gradients are applied for slice selection. The third axis is a second gradient axis Gp where in-plane encoding signals are applied.

The two slices S1, S2 are measured with individual phase patterns P1, P2, wherein the phase angles PA of these phase patterns P1, P2 are shown in the boxes. The boxes on the top show the phase patterns P1, P2 used for the first acquisition of the slices S1, S2, and the boxes on the bottom show the phase patterns P1, P2 used for the second acquisition. The phase patterns P1, P2 of the acquisitions differ in that the second phase pattern P2 is toggled.

Figure 8:
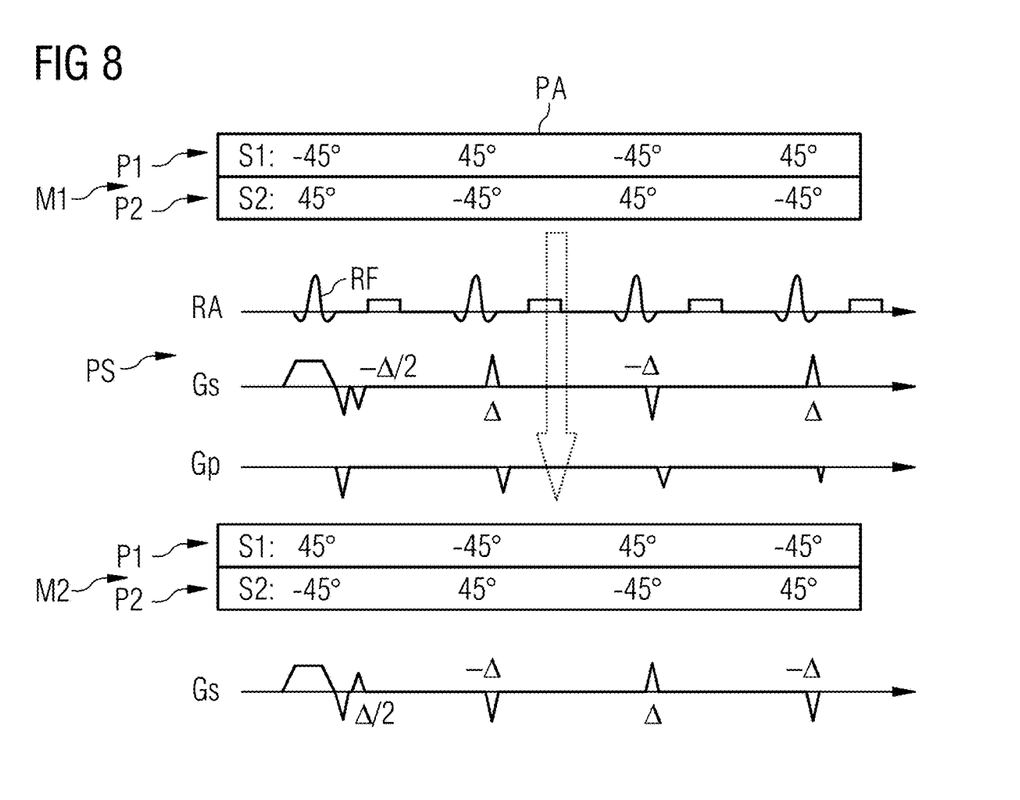
FIG. 8 illustrates another example of pulse sequences for exciting two slices according to an embodiment of the disclosure.

FIG. 8 illustrates another example of pulse sequences for exciting two slices according to an embodiment of the disclosure. Specifically, FIG. 8 shows another example of pulse sequences PS for exciting two slices S1, S2. Here, in contrast to FIG. 7, the phase patterns P1, P2 of a blipped CAIPIRINHA encoding are applied, where the toggling of phase angles PA is done with special gradients. The phase patterns P1, P2 of the acquisitions differ in that the both phase patterns P1, P2 are toggled.

Figure 9:
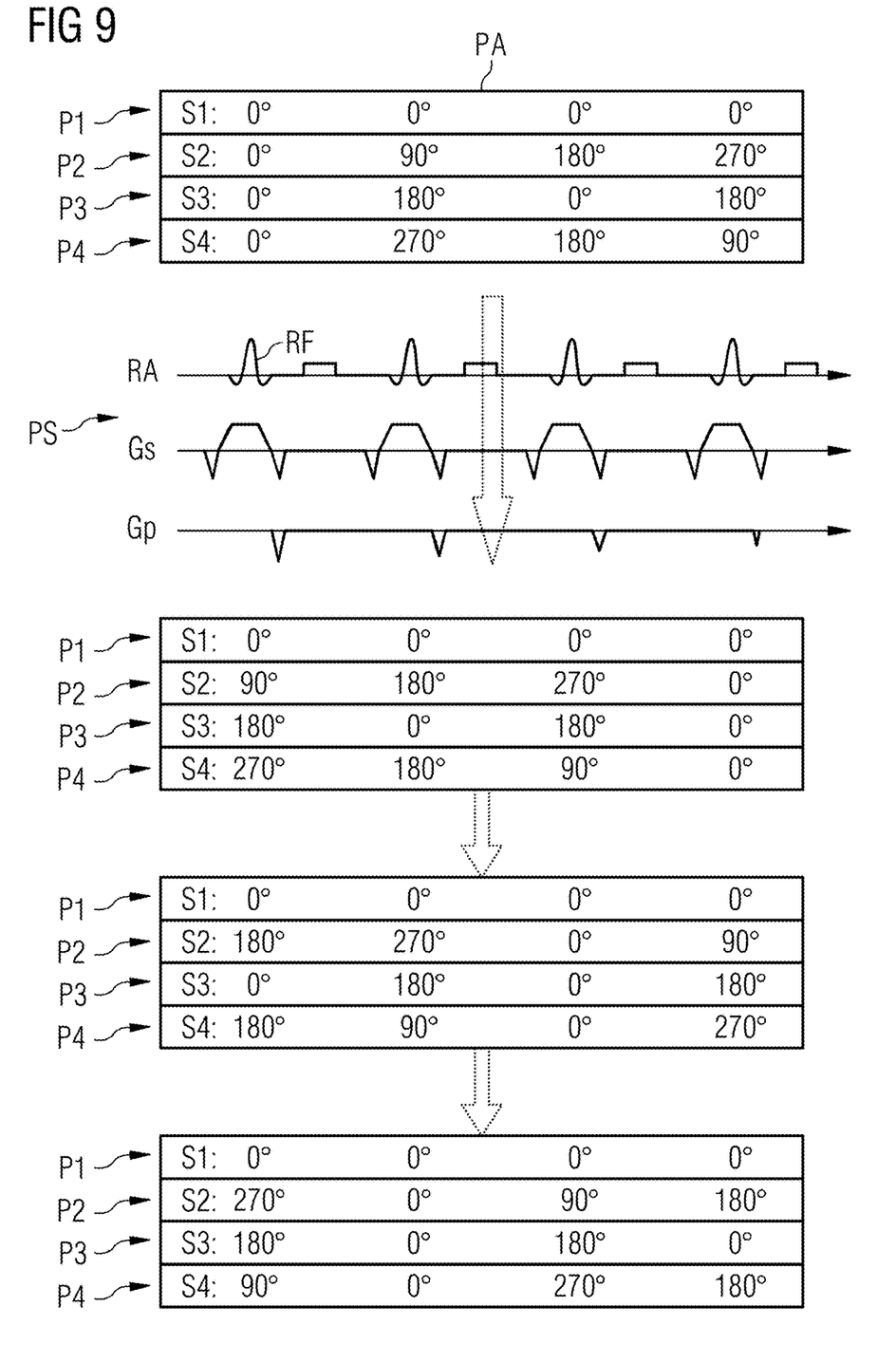
FIG. 9 illustrates an example of pulse sequences for exciting four slices according to an embodiment of the disclosure.

FIG. 9 illustrates an example of pulse sequences for exciting four slices according to an embodiment of the disclosure. In addition to the phase patterns of FIG. 6, special phase patterns P2, P4 are applied where the phase angles PA are 0°, 90°, 180° and 270°. The phase patterns P1, P2, P3, P4 of the acquisitions differ in that "blocks" of phase angles PA for exciting the slices are rotated.

Although the present disclosure has been disclosed in the form of preferred embodiments and variations thereon, it will be understood that numerous additional modifications and variations could be made thereto without departing from the scope of the disclosure. For the sake of clarity, it is to be understood that the use of "a" or "an" throughout this application does not exclude a plurality, and "comprising" does not exclude other steps or elements. The mention of a "unit" or a "module" does not preclude the use of more than one unit or module. The expression "pair" could mean not only two, but also a "set of". The expression "a number" means "at least one".

Independent of the grammatical term usage, individuals with male, female or other gender identities are included within the term.

The various components described herein may be referred to as "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

What is claimed is:

1. A method for magnetic resonance imaging, comprising:
applying at least two different pulse sequences configured to simultaneously excite at least two slices;
measuring k-space lines of the at least two slices in accordance with a Controlled Aliasing in Parallel Imaging Results in Higher Acceleration (CAIPIRINHA) sampling scheme,
wherein each one of the at least two different pulse sequences comprises multiple different phase patterns, each phase pattern being used to excite one of the at least two slices,
wherein the phase patterns of the at least two different pulse sequences are arranged relative to one another according to a Hadamard encoding;
performing a motion correction for the at least two slices; and
reconstructing images from the measured k-space lines by forming image slices based on different linear combinations of corresponding slices acquired with different pulse sequences.

2. The method according to claim 1, wherein:
one of the applied phase patterns is configured to use an integer number N of different phases,
single phases in the N different phases are spaced apart 360°/N in phase space, with N being a divisor of 360°,
for the excitation of M slices, (i) N is a divisor of M, or (ii) M is a divisor of N,
the phase patterns of the different phases having angles AN comprise one of the phase patterns:
$A_1, A_1, A_1, \ldots$
$A_1, A_2, A_1, A_2, \ldots$, with $A_2=360°-A_1$
$A_1, A_2, A_3, A_1, A_2, \ldots$ or
$A_1, A_2, A_3, A_4, A_1, A_2$, and
the Hadamard encoding shifts the phase angles of at least one of the phase patterns of a pulse sequence such that patterns of phase angles applied at one point in time remain the same but occupy different temporal positions in each of the at least two different pulse sequences.

3. The method according to claim 1, wherein for each one of the at least two different pulse sequences, (i) a gradient CAIPIRINHA encoding is applied using additional gradient blips along the slice direction, or (ii) an RF-phase based CAIPIRINHA encoding is applied using varying RF phases, to create CAIPIRINHA phase modulation in k-space.

4. The method according to claim 1, wherein the reconstruction comprises:
reconstructing groups of slices acquired with the same pulse sequence, each group being based on a different pulse sequence,
wherein slices of each group are unaliased or separated by linear combinations of different groups such that reconstructed slices of one group and respective reconstructed slices of another group are (i) added to one another, resulting in a first image-slice, and (ii) subtracted from one another, resulting in a second image-slice, and/or
wherein linear combinations using $e^{i\pi}$ or sine/cosine functions in combination with the phase angles of the multiple different phase patterns are used.

5. The method according to claim 4, wherein each reconstructed group comprises superimposed image slices that comprise information of two or more slices of the group, and the linear combinations of different groups are used to unalias the superimposed slices to form individual image slices.

6. The method according to claim 4, wherein:
each reconstructed group comprises separated slices based on a GeneRalized Autocalibrating Partially Parallel Acquisitions (GRAPPA) reconstruction and a joint slice and in-plane unaliasing, and
linear combinations are used to form individual image slices.

7. The method according to claim 1, wherein the motion correction is performed relative to a selected reference group of slices acquired with the same pulse sequence.

8. The method according to claim 1, further comprising:
generating a 2D or 3D motion field that describes the motion between the same slices acquired with different pulse sequences,
wherein the motion correction is performed based on the generated motion field and the original slices,
wherein the generated motion field is determined based on reconstructions of the slices performed individually for each pulse sequence acquisition, and
wherein the motion correction is non-rigid.

9. The method according to claim 1, wherein the motion correction is performed for reconstructed unaliased slices relative to a reference group of slices acquired with the same pulse sequence.

10. The method according to claim 1, wherein:
the reconstruction is based on an iterative technique in which slice separation, unaliasing, and motion correction are executed in an iterative manner using predetermined data and/or sparsity transforms.

11. The method according to claim 10, wherein (i) a sparsity of images is a measure of a quality of motion correction, and/or (ii) a shot-by-shot reconstruction is used to provide an initial estimate for the reconstruction.

12. The method according to claim 1, wherein the reconstruction utilizes a signal model that is based on a predetermined signal characteristic.

13. The method according to claim 1, wherein the motion correction is performed between corresponding slices acquired with the at least two different pulse sequences prior to forming the different linear combinations of corresponding slices acquired with different pulse sequences, and
wherein the motion correction compensates for movement that occurred between acquisition of the different pulse sequences.

14. The method according to claim 1, wherein the motion correction enables the different linear combinations of corresponding slices acquired with different pulse sequences to achieve slice cancelation via phase patterns resulting from the Hadamard-encoded datasets.

15. A controller for a magnetic resonance imaging system, comprising:
a sequencer configured to:
generate at least two different pulse sequences, each pulse sequence being configured to simultaneously excite at least two slices; and measure k-space lines of the slices in accordance with a Parallel Imaging Results in Higher Acceleration (CAIPIRINHA) sampling scheme, wherein each one of the at least two different pulse sequences comprises multiple different phase patterns, each phase pattern being used to excite one of the at least two slices, and wherein the phase patterns of the at least two different pulse sequences are arranged relative to one another according to a Hadamard encoding;

correction circuitry configured to execute a motion correction for the at least two slices; and a reconstructor configured to reconstruct images from the measured k-space lines by forming image slices based on different linear combinations of corresponding slices acquired with different pulse sequences.

16. The controller according to claim 15, wherein the correction circuitry is configured to execute the motion correction for the at least two slices relative to a selected reference group of slices acquired with the same pulse sequence.

17. The controller according to claim 15, wherein the correction circuitry is configured to estimate a motion field and apply the motion correction based on the estimated motion field.

18. The controller according to claim 15, wherein the correction circuitry is configured to perform the motion correction between fully reconstructed shots and/or for an iterative motion correction.

19. The controller according to claim 15, wherein the controller is part of the magnetic resonance imaging system.

20. A non-transitory computer-readable storage medium having instructions thereon that, when executed by one or more processors associated with a magnetic resonance imaging system, cause the magnetic resonance imaging system to perform magnetic resonance imaging by:

applying at least two different pulse sequences configured to simultaneously excite at least two slices;

measuring k-space lines of the at least two slices in accordance with a Controlled Aliasing in Parallel Imaging Results in Higher Acceleration (CAIPIRINHA) sampling scheme, wherein each one of the at least two different pulse sequences comprises multiple different phase patterns, each phase pattern being used to excite one of the at least two slices, wherein the phase patterns of the at least two different pulse sequences are arranged relative to one another according to a Hadamard encoding;

performing a motion correction for the at least two slices; and reconstructing images from the measured k-space lines by forming image slices based on different linear combinations of corresponding slices acquired with different pulse sequences.

* * * * *